Sept. 20, 1971  W. SCHWARZ  3,606,401
CONNECTING SLEEVE

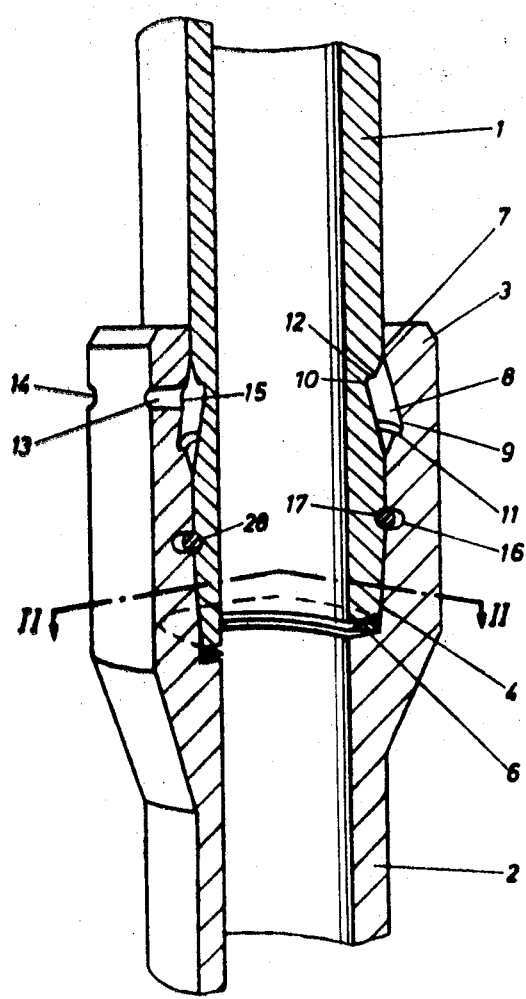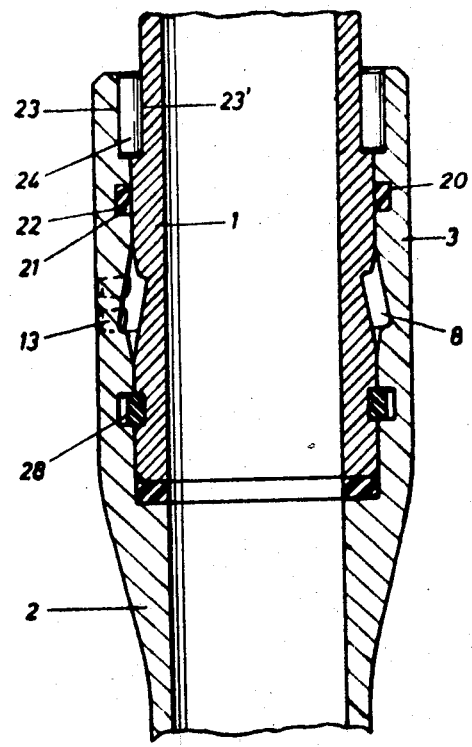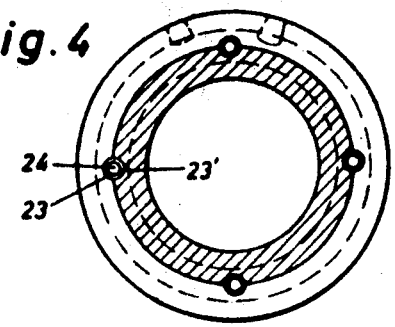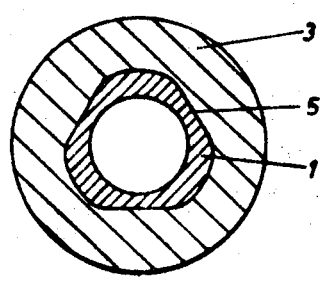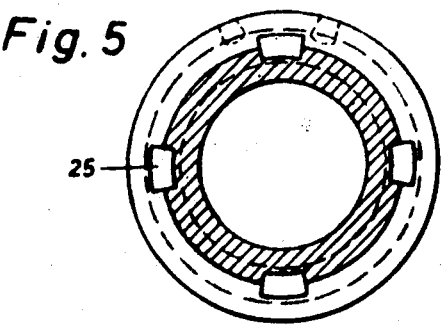

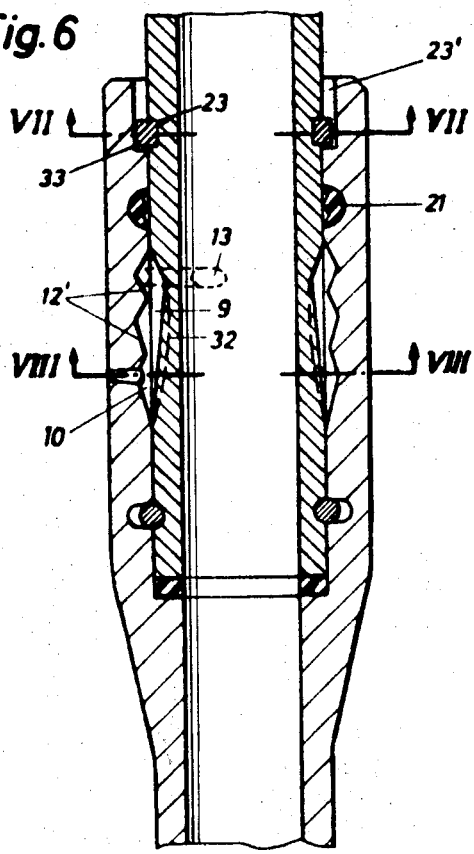
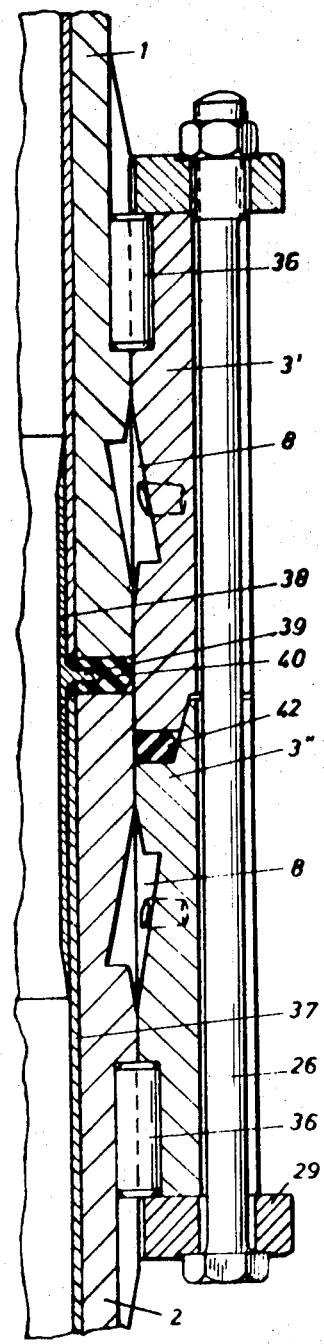
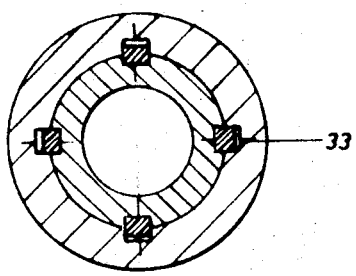
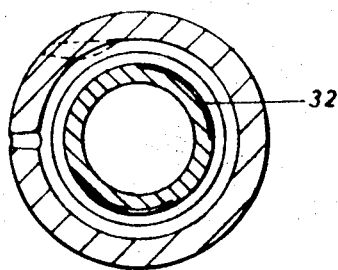

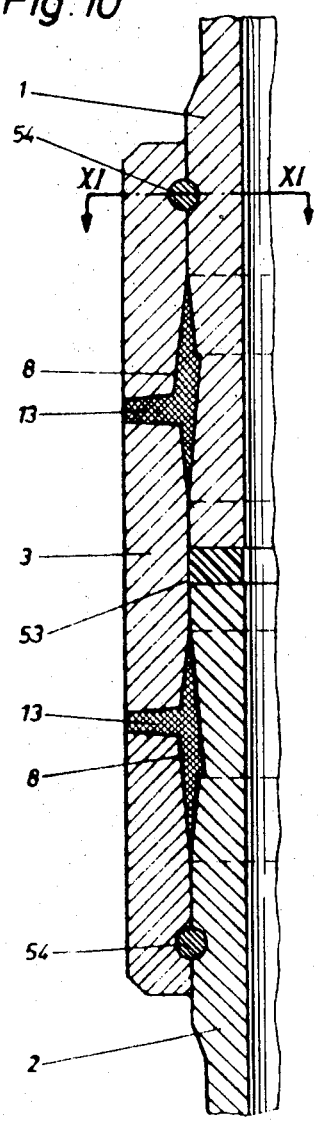
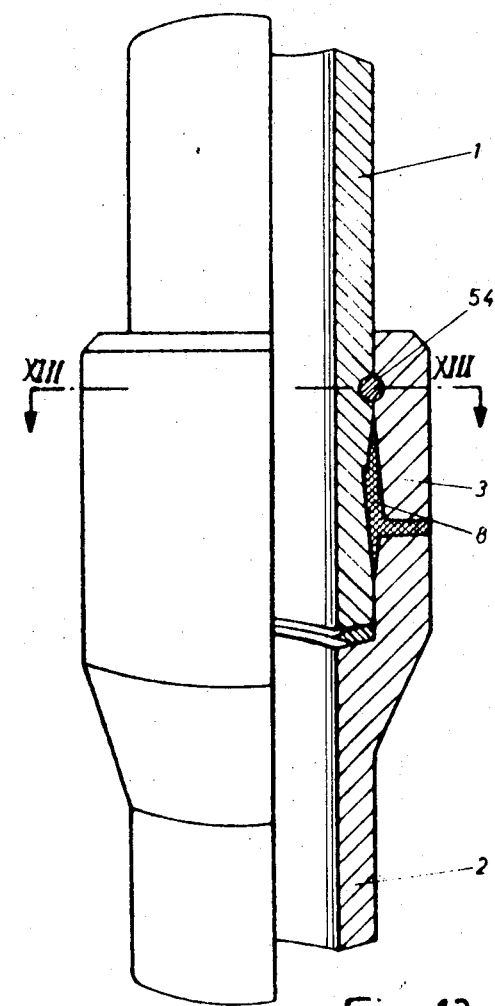
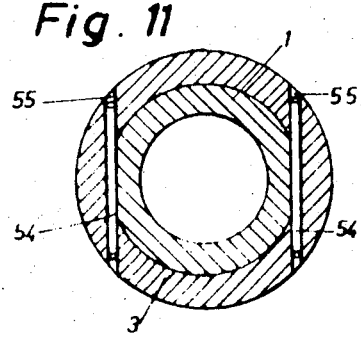
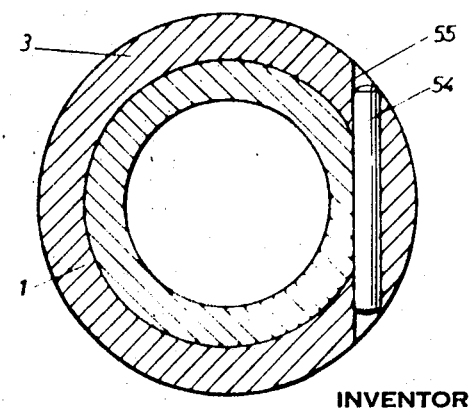

Filed July 22, 1969  5 Sheets-Sheet 5

INVENTOR
BY

United States Patent Office 3,606,401
Patented Sept. 20, 1971

3,606,401
CONNECTING SLEEVE
Walter Schwarz, Vienna, Austria, assignor to Integral Industriebedarf-Gesellschaft m.b.H., Vienna, Austria
Filed July 22, 1969, Ser. No. 843,365
Claims priority, application Austria, July 22, 1968,
A 7,081/68
Int. Cl. F16l *13/00*
U.S. Cl. 285—294
26 Claims

ABSTRACT OF THE DISCLOSURE

A connecting sleeve, particularly for glass fiber reinforced pipes of synthetic material, which comprises pipes to be connected having an outer face, and a sleeve defining an inner wall. The outer face of the pipe and the inner wall have oppositely disposed grooves, the latter defining jointly an annular space having an outwardly leading bore for filling the annular space with a hardening cast mass. The outer face of the pipe and the inner wall have an additional pair of grooves. A resilient ring is received in the additional pair of grooves. Means for securing the ends of the pipes against rotary and axial displacement are arranged and a tension cage surrounds the sleeve. At the ends of the pipes the grooves cross the engaging face of the sleeve and the pipe with conical faces along a common line.

The present invention relates to a connecting sleeve for pipes of all types, which are made of any selected material as metal, cement, asbestos cement, vitrified clay, resined paper, resin, or the like. A preferred field of application are pipes of synthetic material from thermo-plastic and duro-plastic resins as epoxies, non-saturated polyester resins or the like, which can be equipped with any selected inserts, preferably glass fibers, which improve the characteristics of the pipes in any desired direction.

The connecting sleeve is suitable for fitting pipes for liquids and for gases, which are under any selected pressure, whereby it is understood that such pressure can be a pressure above atmospheric pressure, normal pressure, and pressure below atmospheric pressure. Its particular field of application are pressure and high pressure pipes.

It is one object of the present invention to provide a connecting sleeve which complies with these requirements and is of such structure that on the ends of the pipes secured against rotation and against axial displacement, the grooves to be poured and forming an annular space, which grooves sit in the sleeve preferably surrounded by a tension cage and in the jacket face of the pipe, cut with conical faces the engaging face of the sleeve and of the pipe, preferably along a common line.

It is possible thereby, to protect the connection of metal pipes thereby by formation of electric separating points against corrosion, such that the total connecting sleeve and an intermediate part of electric insulating material, respectively, is produced, or still at least in known manner places between the pipe ends and the sleeve an electrically insulating layer.

By an arrangement of an intermediate member with a synthetic material, for instance polytetrafluor-ethylen, the insulating effect can still be enhanced, so that a completely effective protection between the individual lengths of pipes is obtained against vagabond- or dispersion-sneak currents without expensive cathodic protecting measures.

As a casting compound all suitable materials can be considered for the connecting sleeve, designed in accordance with the present invention, which material can be introduced into the annular space and then be hardened under circumstances at which the pipes to be connected are stable.

The selection of the casting compound depends, as already mentioned, in the individual case on the material of which the pipes to be connected and the connecting sleeve are made of. Examples of such casting compounds for the connection of pipes of synthetic material are cast resins, to which metal powder is added, as for instance epoxies with an addition of aluminum dust.

Glass fiber reinforced pipes of synthetic material are often jacketed at their inner side, whereby the liner is at first produced during the pipe production and on the latter the wall of the pipe is built up. If such liner is present, which can comprise by example butadien-acrylnitril with or without addition of polyvinyl-chloride, the butt joint of the pipes in the connecting sleeve is bridged over and sealed up advantageously by means of a sleeve of the same material, which may have a web sitting between the pipe ends.

The prevention of an axial displacement of the parts to be connected can in known manner be formed by a resilient ring, which can be inserted into a further pair of grooves of the engaging face between the connecting sleeve and the pipe. In this case the resilient ring can consist likewise of glass fiber reinforced synthetic material.

For the prevention of a radial displacement one or more wedges, tensioning pins, tensioning sleeves or the like can be used. Finally it is possible to devise conically the engaging face between the connecting sleeve and the pipe or between the two pipes to be connected.

In some embodiments the butt faces of the pipes relative to each other or, in case between the ends of the pipes a ring or a sleeve is provided, the butt faces of the ring with the ends of the pipes can be toothed. A toothing along dovetail-shaped undercuts is preferred.

For the production of this connection at first the connecting sleeve slides over one of the two pipes to be connected. Thereafter the two ends of the pipes are joined with their toothing or with an insulating ring, which has corresponding counter toothing. Thereafter the connecting sleeve slides over the connecting point. Thereafter the annular spaces surrounding the ends of the pipes on both sides of the connecting point are cast.

With these and other objects in view, which will become apparent in the following detailed description, the present invention will be clearly understood in connection with the accompanying drawings in which:

FIG. 1 is a connecting sleeve with a profiled end of the pipe sitting in the connecting sleeve;

FIG. 2 is a section along the lines II—II of FIG. 1;

FIG. 3 is an axial section of a connecting sleeve with a resilient ring and tensioning pins;

FIG. 4 is a top plan view of a blunt end of the connecting sleeve with the tensioning pins;

FIG. 5 is a variation of the embodiment disclosed in FIG. 4, in which instead of tensioning pins, tensioning wedges are provided;

FIG. 6 is an axial section of a connecting sleeve with a step-like grading of the groove sitting in the connecting sleeve and to be cast;

FIG. 7 is a section along the lines VII–VII of FIG. 6;

FIG. 8 is a section along the lines VIII–VIII of FIG. 6;

FIG. 9 is an embodiment of an axial section of a connecting sleeve with a divided sleeve;

FIG. 10 is an axial section of a connecting sleeve with a ring inserted between the flush ends of the pipes;

FIG. 11 is a section along the lines XI–XI of FIG. 10 at a reduced scale;

FIG. 12 is an axial section of a connecting sleeve with a secant bore and tensioning pin;

FIG. 13 is a section along the lines XIII–XIII of FIG. 12;

Figure 14:
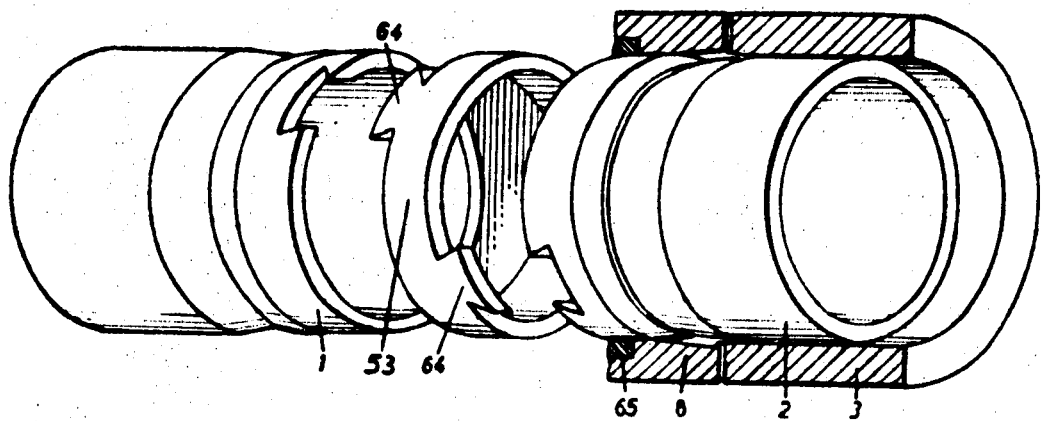
FIG. 14 is a perspective exploded view of the essential parts of a connecting sleeve in which toothings of the pipe ends between the ends of the pipes are provided.

Referring now to the drawings, and in particular to FIG. 1, in the connecting sleeve, as disclosed in FIG. 1, the pipe 1 is inserted in the sleeve 3 formed integrally with the pipe 2 and is retained against rotation by the conical formation 4 and by the profile 5 (FIG. 2) which corresponds with a complementary formation of the inner face of the sleeve 3. At the pipe butt a V-shaped sealing member, known per se, is inserted.

An annular chamber 8 is provided at the engagement face 7 between the sleeve 3 and the pipe 1, which annular sleeve has a double-wedge-like cross-section, which is formed by the two grooves 9 and 10, each of which has a setoff or shoulder 11 and 12, respectively, which is formed as a circular ring disposed radially towards the axis of the pipe and which has preferably rounded or broken edges.

The grooves 9 and 10 cross the engagement face 7 with conical faces along a common line, whereby the apex angle of these faces is at the cutting line an acute angle.

For filling in of the cast mass into the annular space 8, an injection bore 13 is provided, which preferably is designed conically in outward direction, so that its outer opening 14 is smaller than the inner opening 15.

For the securing against an axial displacement prior to the casting or pouring, an additional pair of grooves 16 and 17 is provided in the engagement face 7, in which pair of grooves is inserted a resilient ring 28.

Referring now to the embodiment disclosed in FIG. 3, in which a connecting sleeve is provided in a longitudinal section, in the same manner the pipe 1 is inserted in the sleeve 3 formed integrally with the pipe 2. In addition to the parts already described in connection with the embodiment of FIG. 1, in this embodiment, an O-ring 21 is arranged in a groove 20 of the sleeve 3, which O-ring 21 serves the sealing of the engaging face 7 between the sleeve 3 and the pipe 1 in case of too great a tolerance of the outer diameter of the pipe 1 relative to the annular space 8 to be cast.

As can be ascertained from FIG. 4, in this embodiment oppositely disposed recesses or grooves 23 and 23' are provided for the securing against rotation within the range of the opening of the sleeve in the inner wall of the latter and in the jacket face of the pipe, into which grooves 23 and 23' are inserted tension pins 24.

FIG. 5 discloses a variation to the embodiment of FIG. 4, in which, instead of tension pins 24, tension wedges 25 are provided for the securing against rotation.

While the annular chamber 8 to be cast is designed such in the above-stated embodiments that the groove 9 in the inner wall of the sleeve to the groove 10 in the face of the pipe jacket relative to the radial center plane of the annular space 8 is formed reversed symmetrically, the annular space 8 is in the embodiment disclosed in FIG. 6 not symmetrically formed. In this case, in the groove 10, two set-offs or shoulders like steps 12' are provided, while in the groove 9, as particularly clearly shown in FIG. 8, two grooves 32 which are disposed parallel to the pipe axis are recessed.

For security against rotation in this embodiment are arranged within the range of the sleeve opening four cylinders 33 in corresponding bores 23 of the jacket face of the pipe 1, as well as in groove 23' of the sleeve 3, which cylinders 33 are particularly recognizable in FIG. 7.

While, in the above-described embodiments, the sleeve 3 is integrally formed with the pipe 2, FIG. 9 discloses an embodiment in which the sleeve-like, divided body 3 and 3' is slipped over the non-thickened ends of the pipes 1 and 2 to be connected and are tensioned by means of a tension cage. Instead of the divided sleeve also an integral sleeve could be used, the length of which corresponds with the total length of the two parts 3' and 3". The tension cage can comprise two rings 29 and tension screws 26.

In this sleeve connection are provided two annular spaces 8 to be filled with a cast mass of the type described in FIG. 1, which annular spaces 8 are arranged symmetrically relative to the plane of the pipe butt as to distance and design.

The securing against rotation and simultaneously against an axial displacement can be obtained in such manner, that within the range of the sleeve opening, tensioning sleeves 36 with the axis parallel to the pipe axis in the sleeve 3 as well as in the pipes 1 and 2, respectively, are hammered in, whereby they overlap the engagement face between the sleeve and the pipe.

For sealing of the annular spaces 8 to be cast and for the purpose to close the liner 37, which is interrupted at the pipe butt, a liner sleeve 38 formed with a center web 39 and covering the pipe butt on the inner side of the pipe is provided, the web 39 of which is surrounded by a sealing member 40 which sits resiliently between the sleeve part 3' and the pipe butt. The two parts 3' and 3" of the sleeve, which are set off straight or obliquely at their abutting point and are equipped with a sealing 42, overlap suitably the pipe butt including the sealing 40. It is, however, also possible to arrange the sealing 42 at the point of the pipe butt, whereby the sealing 40 is omitted.

In the embodiment disclosed in FIGS. 10 and 11, the two abutting pipe ends 1 and 2 between which a ring 53 is inserted, are surrounded by the sleeve 3. On both sides of the sealing ring 53 is arranged an annular space 8 built with a casting mass, which annular space 8 is filled through an injection bore 13. The fixing of the coupling parts relative to each other serves a tension pin 54 each, which sits in a bore 55.

The embodiment disclosed in FIG. 12 shows the application of a securing against rotation and axial displacement in the case of a pipe connection by means of connecting sleeves, in which the sleeve 3 is formed integrally with the pipe 2 and the sleeve free end 1 of the following pipe of the conduit is inserted in the sleeve 3. The bore 55 is guided along a secant of the cross-section of the sleeve 3 and receives a tension pin 54.

A further possibility for securing the ends of the pipes 1 and 2 against axial displacement resides in the fact that the ends of the pipes are relative to each other or as shown in FIG. 14 the ends of the pipes 1 and 2 are toothed dove-tail with an insulation ring 53 (FIG. 10), whereby the stakes 64 on both sides of the rings are set off relative to each other, and as the showing of the section faces indicate, in a single punching process.

Figure 15:
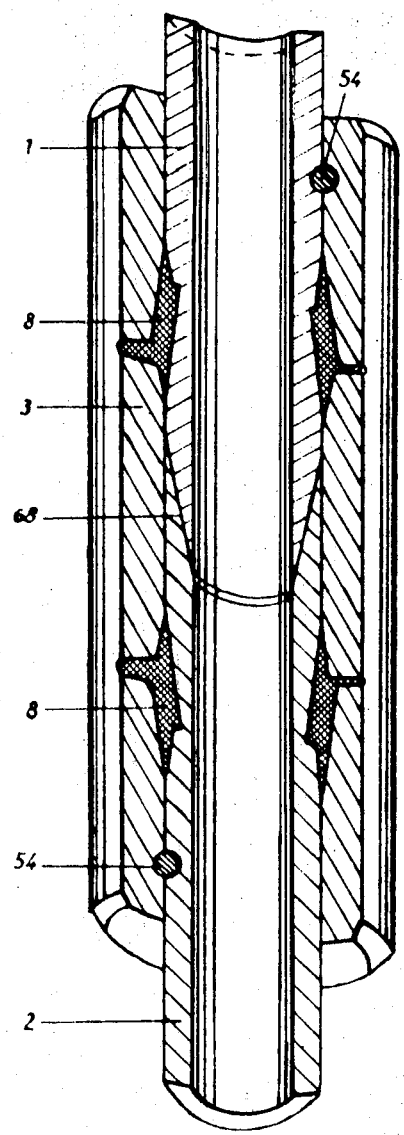
FIG. 15 is a perspective axial section of the connecting sleeve in which the ends of the pipes engage each other on a conical face.

Finally, it is also possible to join the pipe ends 1 and 2 along a conical face 68, as shown in FIG. 15, whereby, for the joining of the pipe connection preferably they are at first glued together on this face. It is to be understood that in this case, also an insulation ring with a congruent butt face formation can be inserted between the butting faces.

Figure 16:
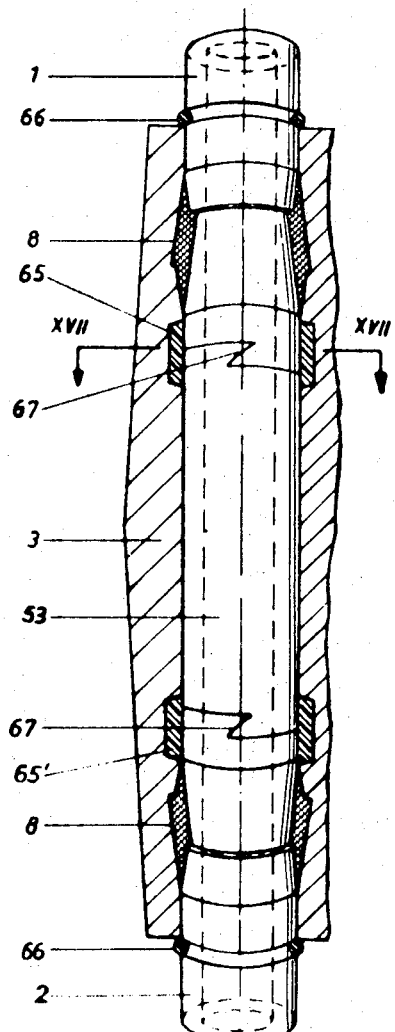
FIG. 16 is an axial section of a connecting sleeve in which each of the two butt edges of the ring serving the electrical insulation is surrounded by a sleeve of synthetic material inserted into the connecting sleeve.
Figure 17:
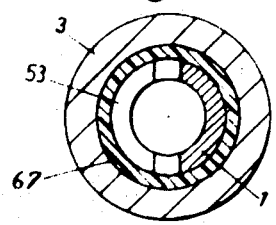
FIG. 17 is a section along the lines XVII–XVII of FIG. 16.

A preferred embodiment of a connection of metal pipes is disclosed in FIGS. 16 and 17, which serves the electric insulation against vagabond currents, first of all against vagabond sneak currents, whereby the ring and branch 53, respectively, produced of synthetic material reinforced with glass fibers, has in this case suitably a length which is at least as great as its outer diameter and amounts at its best to a multiple thereof, for instance, about the treble. The two butt edges of the insulating ring 53 with the ends of the pipes 1 and 2 are surrounded by a sleeve 65 and 65' of synthetic material inserted into the inner face of the sleeve 3. The sleeve 3 comprises in the shown embodiment likewise reinforced synthetic material, which, however, is appreciably harder than the material of the sleeves 65 and 65'. The sleeve 3 comprises preferably synthetic material reinforced with glass fibers. A resilient ring 66 serves the location of the position of the sleeve 3 on the pipe ends 1 and 2, which resilient ring 66 supports itself against the side face of the sleeve 3 and is inserted into the groove of the pipe ends 1 and 2, respectively.

Each of the two butts between the insulation ring 53 and the pipe ends 1 and 2 is guided along two radial planes of the pipe connection disposed spaced apart from each other and a further plane cutting these planes, which are oblique to the axis of the pipe connection and which axis cuts in the center between the two radial planes, so that on each butt are created two toothings along a face 67, of which, in FIG. 16, one of each is visible.

Figure 18:
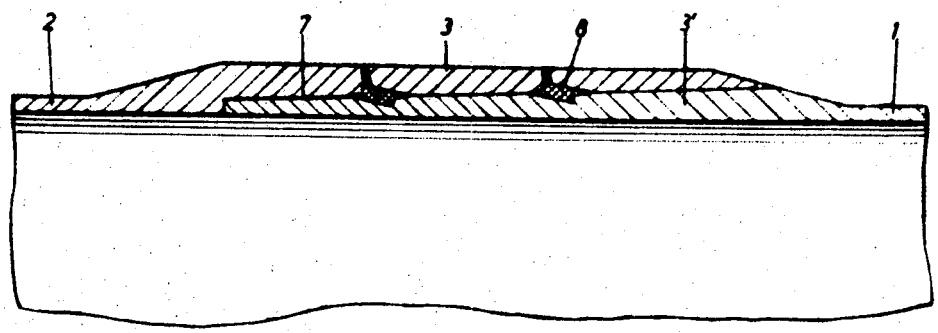
FIG. 18 is an axial section of a connecting sleeve for pipes with a conical engaging face between the sleeve and the pipe with two annular grooves, which are filled with a cast mass.

In pipeline piping a connection as disclosed in FIG. 18 is preferable, in which the sleeve 3 is integrally formed with the pipe 2 and the end 3' is integral with the pipe 1, whereby the sleeve 3 is conically bored and the end 3' is complementary conically formed and the sleeve 3 slides sealingly over the end 3', so that the two parts engage each other along a conical face 7. The engagement face 7 is interrupted by at least one annular space 8.

While I have disclosed several embodiments of the present invention, it is to be understood that these embodiments are given by example only and not in a limiting sense.

I claim:

1. A connecting sleeve, particularly for glass fiber reinforced pipes of synthetic material, comprising
   at least one to be connected, one of said pipes defining an outer face,
   a sleeve defining an inner wall and engaging said outer face of said one pipe at an engagement face,
   said outer wall of said one pipe and said inner wall defining oppositely disposed first and second grooves, respectively, the latter defining jointly an annular space and having an outwardly leading bore for filling said annular space with a hardening cast mass,
   means preventing the ends of said one pipe and sleeve against relative rotary displacement and additional means preventing relative axial displacement of the ends of said one pipe and sleeve upon filling said annular space, and
   at the end of said pipe at least a portion of said outer wall and said inner wall defining said first and second grooves intersecting said engagement face of said sleeve and said one pipe with conical faces.

2. The connecting sleeve, as set forth in claim 1, wherein said second groove in said inner wall of said sleeve is reversed relative to said first groove on the outer face of said one pipe in relation with the radial center line of said annular space.

3. The connecting sleeve, as set forth in claim 1, which includes
   at least one shoulder in said first and second grooves, respectively, and
   said shoulder is formed as a circular ring disposed radially to the longitudinal axis of said one pipe.

4. The connecting sleeve, as set forth in claim 3, wherein said at least one shoulder comprises a plurality of shoulders provided in step-like form in one of said grooves.

5. The connecting sleeve, as set forth in claim 1, further comprising a second connecting sleeve
   a tension means surrounding said sleeves and comprising rings and tension screw bolts operatively connected together to hold said sleeves in abutting engagement.

6. The connecting sleeve, as set forth in claim 1, which includes
   a second bore leading outwardly from said annular space, said second bore being adapted to release air from said annular space, and
   both said bores are conical in outward direction.

7. The connecting sleeve, as set forth in claim 6, wherein
   said first mentioned bore has a larger outer opening than that of said second bore.

8. The connecting sleeve, as set forth in claim 1, which includes
   sealing rings disposed adjacent said annular space on the engagement face of said sleeve and said one pipe, in order to increase the safety of the sealing prior to the hardening of the cast mass.

9. The connecting sleeve, as set forth in claim 1, wherein said means preventing the ends of said one pipe and sleeve against relative rotary displacement includes
   said outer face at the end of said one of said pipes having a non-rounded profile for securing same against rotation, and
   said end of said one of said pipes sits in a correspondingly formed bore of said sleeve, the latter formed integrally with the end of another of said pipes.

10. The connecting sleeve, as set forth in claim 1, wherein said means preventing the ends of said one pipe and sleeve against relative rotary displacement includes
    said inner wall of said sleeve and said outer face of said one pipe having within the range of the bore of said sleeve one to four recesses disposed oppositely in pairs, respectively, and parallel to the axis of said one pipe, and
    members inserted in said recesses.

11. The connecting sleeve, as set forth in claim 10, wherein
    said members are tensioning sleeves having their axis parallel to the longitudinal axis of said one pipe and received in said sleeve and said one pipe, respectively, within the range of said sleeve bore, and
    said tensioning sleeves overlapping said engagement face between said sleeve and said one pipe.

12. The connecting sleeve, as set forth in claim 11, which includes a second pipe
    said pipes having the same diameter and being longitudinally positioned defining adjacent pipe butts, respectively,
    said sleeve constituting a common connecting sleeve surrounding the ends of said pipes,
    a liner sleeve covering said pipe butts and positioned on the inside of said pipes and equipped with a center web, and
    said common connecting sleeve and each of said pipes defining therebetween, respectively, relative to a plane between said pipe butts, one of said annular spaces, both of said annular spaces are symmetrical as to distance and arrangement.

13. The connecting sleeve, as set forth in claim 12, wherein
    said connecting sleeve is divided to form parts, and
    a sealing element is inserted between said parts.

14. The connecting sleeve, as set forth in claim 13, wherein
    said sealing element is made of soft elastic material.

15. The connecting sleeve, as set forth in claim 12, further comprising
    a liner inside of each of said pipes, respectively, and
    said liner sleeve is inside of said liners and is made of the same material as said liners of said pipes to be connected.

16. The connecting device, as set forth in claim 15, which includes
a ring-like intermediate member of electrically insulating material inserted between the adjacent pipe ends.

17. The connecting sleeve, as set forth in claim 1, wherein there is a second pipe
said pipes have the same diameter and are longitudinally positioned defining adjacent pipe ends, and wherein said means preventing the ends of said one pipe and sleeve against relative rotary displacement includes
a ring inserted between said adjacent pipe ends and having butt faces,
said butt faces of said ring are toothed with said pipe ends relative to each other at least at one point along a face inclined to the axis of said sleeve.

18. The connecting sleeve, as set forth in claim 17, wherein
said butt faces are toothed with dove-tail like undercuts.

19. The connecting sleeve, as set forth in claim 17, further comprising
a sealing serving sleeve inserted into said first mentioned sleeve between said pipe ends, and
said first mentioned sleeve overlaps said adjacent pipe ends relative to each other and said adjacent pipe ends with said ring.

20. The connecting sleeve, as set forth in claim 19, wherein
said ring is made of insulating material and the length thereof is at least as large as its outer diameter.

21. The connecting sleeve, as set forth in claim 1, wherein there is a second pipe and
said pipes to be connected have pipe ends which engage each other on a conical face.

22. The connecting sleeve, as set forth in claim 21, wherein said means preventing the ends of said one pipe and sleeve against relative rotary displacement includes
said sleeve has at least one bore guided along a secant of its cross-section,
a tension pin in said at least one bore, and
said at least one bore is disposed within said one pipe and sleeve in the area of said engagement face between said sleeve and the end of said one pipe.

23. The connecting sleeve, as set forth in claim 10, wherein
said members are pins.

24. The connecting sleeve, as set forth in claim 10, wherein
said members are tension sleeves.

25. The connecting sleeve, as set forth in claim 1, further comprising
said outer face of said one pipe and said inner wall have an additional pair of grooves,
a resilient sealing ring having butt faces and received in said additional pair of grooves.

26. A connecting sleeve, particularly for glass fiber reinforced pipes of synthetic material, comprising at least one pipe to be connected, one of said pipes defining an outer face, a sleeve defining an inner wall and engaging said outer face of said one pipe at an engagement face, said outer wall of said one pipe and said inner wall defining oppositely disposed first and second grooves, respectively, the latter defining jointly an annular space and having an outwardly leading bore for filling said annular space with a hardening cast mass, each of said grooves having a bottom wall, means independent of said grooves securing the ends of said one pipe and sleeve against relative rotary and axial displacement, and at the end of said pipe said bottom walls of said first and second grooves intersect said engagement face of said sleeve and said one pipe with conical faces.

References Cited
UNITED STATES PATENTS

| | | | |
|---|---|---|---|
| 615,976 | 12/1898 | Felsche | 285—294 |
| 1,839,676 | 1/1932 | Hicks | 285—294X |

FOREIGN PATENTS

| | | | |
|---|---|---|---|
| 19,226 | 9/1929 | Australia | 285—294 |
| 748,454 | 5/1956 | Great Britain. | |

DAVE W. AROLA, Primary Examiner

U.S. Cl. X.R.

285—297, 330, 368, 369